Jan. 26, 1943.   S. J. HARLEY ET AL   2,309,312
APPARATUS FOR FORMING OR DRESSING THE OPERATIVE
FACES OF GRINDING WHEELS
Filed Jan. 6, 1941   2 Sheets-Sheet 1

FIG.I.

Inventors
Stanley J. Harley
John E. Wainwright
by Babcock & Babcock
Attorneys

Patented Jan. 26, 1943

2,309,312

UNITED STATES PATENT OFFICE 2,309,312

APPARATUS FOR FORMING OR DRESSING THE OPERATIVE FACES OF GRINDING WHEELS

Stanley Jaffa Harley and John Ernest Wainwright, Coventry, England

Application January 6, 1941, Serial No. 373,376
In Great Britain April 18, 1939

2 Claims. (Cl. 125—11)

This invention relates to apparatus for forming or dressing the operative faces of grinding wheels used for form-grinding and is of the kind in which the diamond or other cutting tool has a form-generating motion.

The object of the invention is to form the face of the grinding wheel with helical serrations or cutting edges for producing screw thread and gear tooth forms.

According to the present invention apparatus of the kind and for the purposes referred to is characterized in that the component motions of the dressing tool are correlated with each other and with the rotary motion of the grinding wheel in such a manner that a variation in the speed of any one of said correlated motions automatically causes appropriate corrective variations in the others.

In the accompanying drawings.

Figure 1:
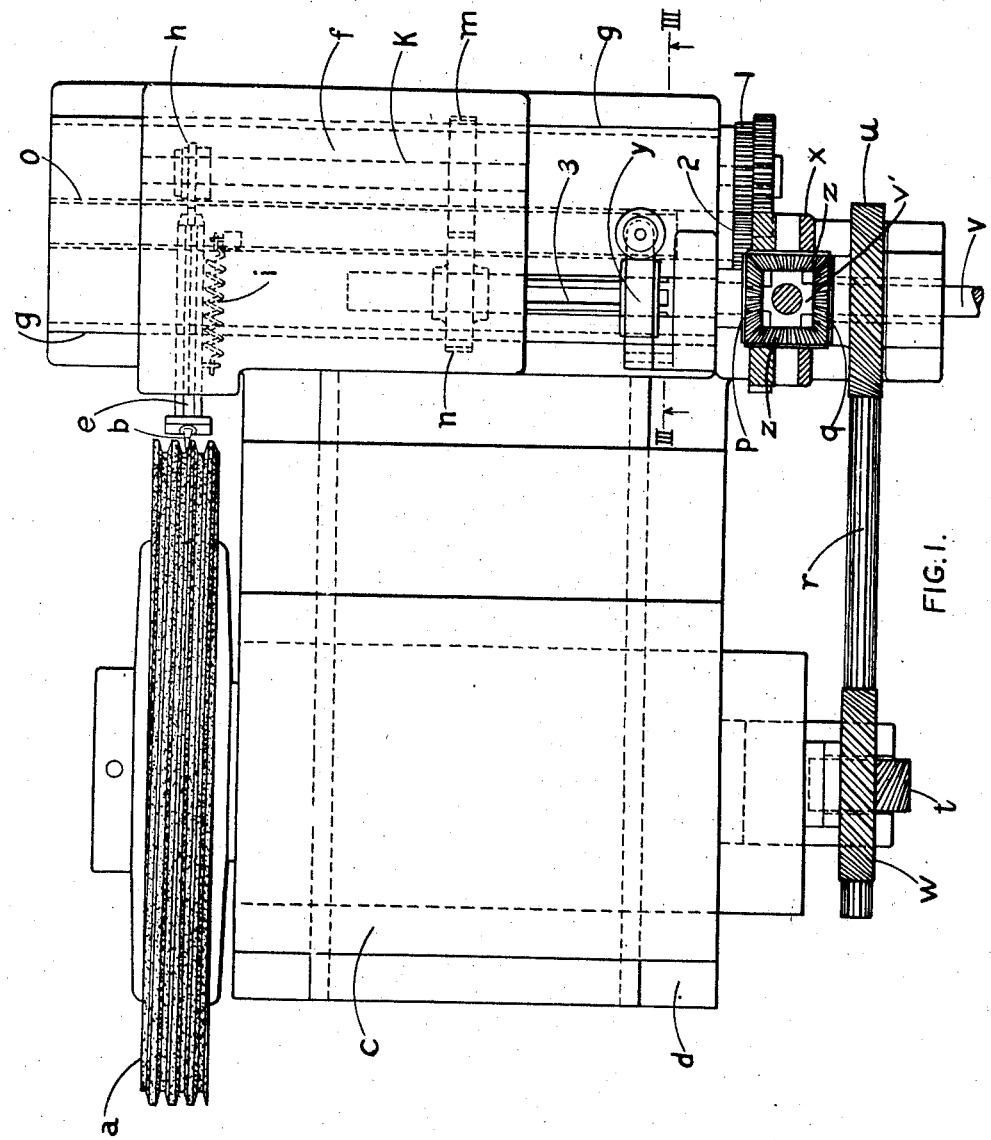
Figure 1 is a plan view of an arrangement of apparatus embodying the present invention.
Figure 2:
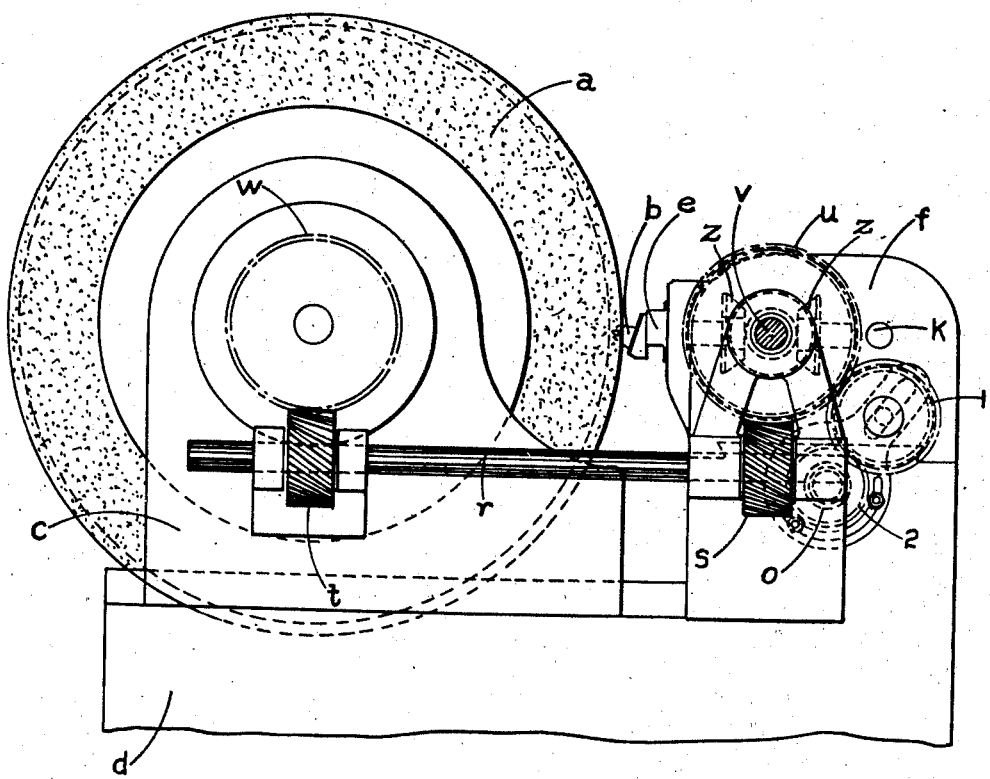
Figure 2 is a side elevation thereof.

Referring to the construction shown in the drawings, $a$ represents the grinding wheel and $b$ the dressing tool.

The grinding wheel is rotatably mounted in a slide $c$ which is movable upon the bed $d$ of the machine to bring the wheel into and out of engagement with the dressing tool on the one hand and the work-piece (not shown) on the other. Any well known and suitable means may be employed for moving this slide.

The dressing tool $b$ is carried by a slide $e$ carried by a saddle $f$ which is movable in guides $g$ on the bed of the machine in a direction at right angles to that of the slide $c$ carrying the grinding wheel, i. e. parallel with the axis of the grinding wheel.

The slide $e$ carrying the dressing tool moves in a direction at right angles to that of the saddle $f$ and is moved towards the axis of the grinding wheel by means of a rotating cam $h$ and away from said axis by means of a return spring $i$ one end of which is fixed to the tool slide $e$ and the other to the saddle $f$.

The cam $h$ is mounted on a spindle $k$ journalled in and moving with the saddle and is driven from a splined shaft 3 mounted in the bed of the machine, by means of gear wheels, one $m$ of which is keyed to the cam spindle whilst the other $n$ is slidably mounted on the splined shaft.

The saddle is moved along the bed of the machine by means of a leadscrew $o$ and is provided on the underside with cheeks (not shown) engaging the gear wheel $n$ so that as the saddle moves along the bed of the machine the gear wheel $n$ moves with it along the splined shaft 3.

The depth component motion of the dressing tool by means of the cam $h$ is correlated with the rotary motion of the grinding wheel $a$ and with the pitch component motion of said tool derived from the movement of the saddle $f$, by means of a differential gear, the crown wheels $p$ and $q$ of which are operatively connected respectively with the splined shaft 3 and with a skew gear drive for the grinding wheel. This drive comprises a splined shaft $r$ carrying skew gear pinions $s$ and $t$ meshing respectively with a skew gear wheel $u$ fixed to the crown wheel $q$ and with a skew gear wheel $w$ fixed to the spindle of the grinding wheel. The planet pinion carrier $x$ is driven independently of the crown wheel $q$ by the shaft $v$ and the spider $v'$ carried thereby and is in operative driving connection, through the intermediate change speed gears 1 and 2 with the lead screw $o$ which, is responsible for the pitch component motion of the dressing tool. The skew gear $u$ carrying the crown wheel $q$ is driven independently of the shaft $v$ driving the planet pinion carrier $x$ in any suitable and known manner and is operatively connected with the cam shaft $k$ through the planet pinion $z$ and the crown wheel $p$ on the splined shaft 3.

Any suitable reversible driving gear can be coupled to the shaft $v$ and the independently driven skew gear $u$ can be operated in any appropriate manner from a separate driving source. However, our invention is not concerned with such known expedients of driving and reversing of the shaft $v$ and of driving the skew gear $u$ but resides in the means for correlating the component motions of the dressing tool $b$ with each other and with the rotary motion of the grinding wheel in such manner that a variation in the speed of any one of said correlated motions automatically causes appropriate corrective variations in the others.

Figure 3:
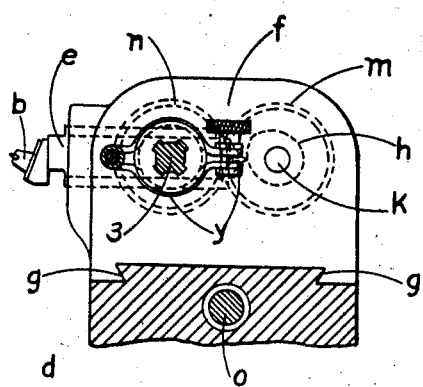
Figure 3 is a section taken on the line III—III of Figure 1.

Means such as the clamping device $y$ shown in Figure 3 may be employed to lock the shaft 3 and hence the member $h$ against rotation.

Assuming that gear $u$ be rotated, that shaft $v$ be not driven or independently rotated, and that drive crown gear $q$, pinions $z$, and driven crown gear $p$ all turn at the same speed, their rotation would cause no movement of the planet carrier $x$ and hence no rotation of the lead screw $o$ and consequently no traversing movement of the saddle $f$, nor of the dressing tool $b$.

Assuming that shaft $v$ be not independently rotated and that driven crown wheel or gear $q$ rotates faster than driven crown gear $p$, such difference in speed of rotation will be taken up in rotation of pinions $z$ about their respective axes with consequent bodily movement about the gears $p$ and $q$, such movement causing the rotation of the planet gear carrier $x$, which in turn drives double gear $l$, which has a front portion in mesh with and driven by said carrier $x$ and a rear portion in mesh with and driving gear $2$ secured to the front end portion of lead screw $o$ to turn therewith, such turning or rotation of the screw $o$ causing a traverse movement of the saddle $f$ with the slide $e$ and dressing tool or diamond $b$ with respect to the grinding wheel $a$.

Assuming that gear $u$ be not independently rotated, that shaft $v$ with its spider $v'$ be rotated, that shaft $v$ and splined shaft $3$ rotate in the same direction at the same speed, and that the planet pinion carrier $x$ in rotating with spider $v'$ and meshing with double pinion $l$, which in turn is in gear with pinion $2$ keyed to the end portion of lead screw $o$, causes rotation of the latter at a speed in direct relation to the speed of rotation of the splined shaft $3$ and hence traversing movement of the saddle $f$, the planet pinions $z$ will not rotate about their respective axes but will serve to lock the drive crown gear $q$ and the driven crown gear $p$ together to turn as one, and the rotary movement of the skew gear $u$ and of the grinding wheel $a$ as driven by said skew gear $u$ through the interposed pinion $s$, shaft $r$, pinion $t$ and gear $w$ will be due entirely to the turning of the skew gear $u$ by reason of the meshing engagement between the crown drive gear $q$, crown driven gear $p$ and the interposed pinions $z$ as the planet pinion carrier $x$ is rotated by the shaft $v$ and its spider $v'$.

Operation

An operative cycle of movement of the related trains of mechanism involves the simultaneous and independent driving or rotation of the skew gear $u$ and the shaft $v$ with its spider $v'$. Merely for purposes of explanation, assuming that the skew gear $u$ and the shaft $v$ with its spider $v'$, while independently driven or rotated, rotate in the same direction, the following operations will simultaneously occur:

The skew gear $u$ in rotating, through drive gearing including pinions $s$, shaft $r$, pinion $t$ and gear wheel $w$ mounted on the shaft of grinding wheel $a$ to turn therewith, will cause the grinding wheel $a$ to rotate at a definite rate of speed in relation to the rate of speed of rotation of the skew gear $u$.

Also, the skew gear $u$ in rotating will rotate the drive crown gear $q$ integral with skew gear $u$, and said gear $q$ will rotate the planet pinions $z$ about their respective axes and the latter will cause the driven crown gear $p$ and the splined shaft $3$ on which said gear $p$ is fast to rotate at a definite rate of speed with relation to the rate of speed of rotation of the skew gear $u$ but in the opposite direction. The rotation of splined shaft $3$ serves to rotate the cam $h$ at a definite rate of speed with relation to the rate of speed of rotation of the splined shaft $3$ through the intermediary of gear $n$, gear $m$, and shaft $k$, and also at a definite rate of speed with relation to the different rate of speed of rotation of skew gear $u$.

The shaft $v$ and its spider $v'$ in rotating together will rotate the planet pinion carrier $x$. The latter is formed with gear teeth in mesh with the forward or outer set of gear teeth of the double pinion $l$, the rear or inner set of gear teeth of which is in mesh with the driven pinion $2$ keyed to the outer end portion of the lead screw $o$, whereby the rotation of the carrier $x$ serves to rotate the lead screw $o$ and to move the saddle $f$ with the tool carrier or slide $e$ and the tool $b$ in a traverse stroke or motion across the grinding or operative face of the grinding wheel $a$ and, in the arrangement illustrated, parallel to the axis of the wheel $a$ and with a speed of movement directly related to the speed of rotation of said planet pinion carrier $x$.

Since of necessity it follows that, if the skew gear $u$ and the shaft $v$ with its spider $v'$ are independently rotated, the drive crown gear $q$ and the driven crown gear $p$ cannot be turning at the same speed, but the speed and direction of rotation of the shaft $v$ with its spider $v'$ will be superimposed upon the independent motion imparted to the drive crown gear $q$ and hence the skew gear $u$ integral therewith, whereby the speed of rotation of the cam $h$ will automatically be advanced or retarded with respect to the speed of rotation of the grinding wheel $a$ according to the speed and direction of rotation of the planet carrier $x$ and lead screw $o$, it is manifest that the interposition of the differential gear serves to unite the several groups of mechanism or trains of gearing into an interrelated combination of trains of gearing wherein a variation in the speed of one or more of such trains, or the direction of operation thereof, with respect to the other trains of gearing of such combination is permitted and automatically compensated for.

Since the diamond tool $b$ has a compound movement made up of a reciprocatory movement toward the periphery of the grinding wheel $a$ together with a traversing movement parallel to the axis of the grinding wheel, it follows that the tool $b$ during a single revolution of the grinding wheel $a$ and reciprocatory cycle of operation of said tool $b$, will dress in peripheral succession a portion of the crest of one serration of the wheel, will ride down and dress a portion of one side of said serration, ride across and dress a portion of the floor of the valley between that and the next adjacent serration, will ride up and dress a portion of the adjacent side of the said next adjacent serration, and will then start to dress a portion of the crest of said next adjacent serration until the point axially and peripherally of said wheel with respect to said serration is reached at which the beginning of the next revolution of said wheel and reciprocatory cycle of said diamond commences, it follows that only portions of two serrations are dressed during one cycle of reciprocatory movement of said diamond $b$ and that a single complete traverse of the diamond $b$ across the face of the grinding wheel would result only in a small portion of each face of each serration and intervening valley or floor being dressed, so that it at once becomes apparent that a plurality of traverses of the diamond $b$ across the grinding face of the grinding wheel $a$, and in peripherally overlapping relation, would be necessary to either generate or dress the grinding face of the wheel $a$.

This cycle of operations is repeated until the full form of the helical serrations is obtained, the shaft $3$ being locked against rotation by the clamping device $y$ at the completion of each traverse of the dressing tool or diamond $b$, so that by reversing the direction of rotation of the shaft $v$ with its spider $v'$ the saddle $f$ and tool or diamond $b$ can be returned to the starting point. The angular position of the wheel $a$ will, of course, vary for each traverse, the successive dressing operations overlapping each other.

The arrangement as will now be seen is such that by means of the differential gear the speed of operation of the dressing tool by means of the cam $h$ is automatically advanced or retarded with respect to the revolutions of the grinding wheel $a$ according to the speed and direction of rotation of the planet pinion carrier $x$ and lead screw $o$.

By appropriate operation of the clamping device $y$ the dressing apparatus above described can be used for forming the grinding wheel $a$ with a plain or helical grooved surface preliminary to forming the wheel $a$ with generated helical serrations, that is to say, the dressing tool $b$ can be used to operate in the orthodox manner.

By releasing the clamp and turning the splined shaft 3 any desired setting of the cam may be obtained for the preliminary dressing operation.

We claim:

1. Dressing apparatus for grinding wheels used for form grinding, said apparatus comprising a saddle, a slide mounted for reciprocatory movement in said saddle, a dressing tool carried by said slide, and a differential gearing comprising a drive crown gear, a driven crown gear, a plurality of planet pinions, and a planet pinion carrier, in combination with means for rotating said grinding wheel, a member turning with said drive crown gear for driving said grinding wheel rotating means, means driven by said driven crown gear for regulating the reciprocatory position of said dressing tool, means driven by said planet pinion carrier for moving said saddle to traverse said dressing tool across the face of said grinding wheel, and independent means for causing rotary movement of said planet pinion carrier for moving said saddle.

2. Dressing apparatus for grinding wheels used for form grinding, said apparatus comprising a dressing tool, means for imparting a compound form of generating motion to said dressing tool and comprising an element for causing a traverse movement of said tool across the face of said grinding wheel, an element for causing a reciprocatory movement of said tool, and a differential gearing comprising a drive crown gear, a driven crown gear, a plurality of planet pinions, and a planet pinion carrier, in combination with an element for causing rotation of said grinding wheel, means turning with said drive crown gear for causing actuation of one of said elements, means turning with said driven crown gear for causing actuation of another of said elements, means driven by said planet pinion carrier for causing actuation of the remaining one of said elements, and independent means for causing the rotation of said planet pinion carrier whereby the operation of said independent means will be super-imposed on the operation of all of said elements.

STANLEY JAFFA HARLEY.
JOHN ERNEST WAINWRIGHT.